(12) United States Patent
Suzuki

(10) Patent No.: US 6,526,472 B2
(45) Date of Patent: *Feb. 25, 2003

(54) ACCESS CONTROL METHOD, ACCESS CONTROL APPARATUS AND COMPUTER READABLE MEMORY STORING ACCESS CONTROL PROGRAM

(75) Inventor: Shigeo Suzuki, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/363,822

(22) Filed: Jul. 30, 1999

(65) Prior Publication Data

US 2002/0166022 A1 Nov. 7, 2002

(30) Foreign Application Priority Data

Aug. 3, 1998 (JP) .......................................... 10-219479

(51) Int. Cl.[7] .............................................. G06F 12/00
(52) U.S. Cl. ........................... 711/103; 711/4; 711/202; 710/26; 710/52; 365/185.11; 365/185.33
(58) Field of Search .................................. 711/202, 203, 711/206, 103, 4; 710/52, 26; 365/185.11, 185.33

(56) References Cited

U.S. PATENT DOCUMENTS

| | | | | |
|---|---|---|---|---|
| 5,598,548 A | * | 1/1997 | Matsuo et al. | 711/103 |
| 5,603,001 A | * | 2/1997 | Sukegawa et al. | 711/103 |
| 6,092,170 A | * | 7/2000 | Kori | 711/202 |
| 6,101,590 A | * | 8/2000 | Hansen | 711/203 |

* cited by examiner

Primary Examiner—Do Hyun Yoo
Assistant Examiner—Jasmine Song
(74) Attorney, Agent, or Firm—Fitzpatrick, Cella, Harper & Scinto

(57) ABSTRACT

A file manager and buffer cache manager generate access information for accessing a flash ROM in units of blocks on the basis of an access request designated by a user program. When the access request is a data read request, a flash disk driver calculates an access address to the flash ROM on the basis of a block designated by the access information, and sends back the calculated access address to the buffer cache manager. The buffer cache manager reads out data from the flash ROM using the received access address, and directly transfers the obtained data to a memory area managed by the user program.

24 Claims, 9 Drawing Sheets

FIG. 4

MAPPING TABLE 201

| VERTUAL BLOCK NUMBER | REAL BLOCK NUMBER |
|---|---|
| 0 | 2 |
| 1 | |
| 2 | |
| 3 | 256 |
| 4 | 128 |
| ⋮ | ⋮ |
| 8388607 | |

FIG. 5

UNIT MANAGEMENT TABLE 202

| | 0 | 1 | |
|---|---|---|---|
| ERASE COUNT | 120 | 132 | |
| REAL BLOCK WRITE STATE | 0: GARBAGE<br>1: ACTIVE<br>2: ACTIVE<br>-----<br>127: GARBAGE | 128: ACTIVE<br>129: ACTIVE<br>130: FREE<br>-----<br>255: FREE | |

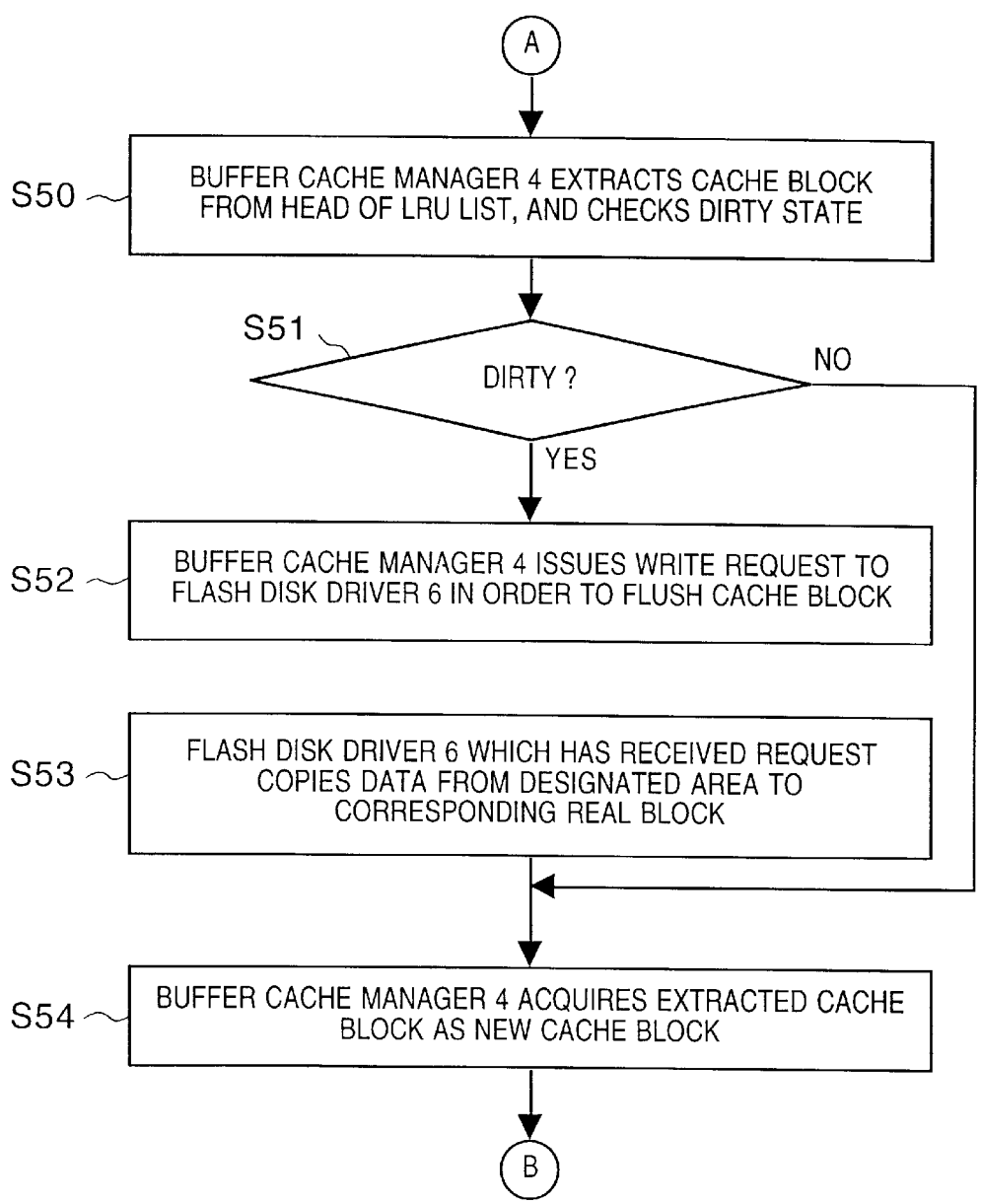

ACCESS CONTROL METHOD, ACCESS CONTROL APPARATUS AND COMPUTER READABLE MEMORY STORING ACCESS CONTROL PROGRAM

BACKGROUND OF THE INVENTION

1. Field of the Invention

The present invention relates to an access control method, access control apparatus, and computer-readable memory storing an access control program and, more particularly, to an access control method, access control apparatus, and computer-readable memory storing an access control program that are suitable for using a flash ROM as a data storage area.

2. Description of the Related Art

In general, a file system uses a secondary storage device such as a floppy disk device or hard disk device as a data storage area. Such secondary storage device can be generally random-accessed in units of 512-or 1,024-byte blocks.

This secondary storage device is disadvantageous because of a low access speed and an access only in units of blocks. For this reason, the file system using this secondary storage device prepares a buffer cache on a memory such as a RAM to suppress an actual access frequency to the secondary storage device so as to improve performance, and to allow a file system user (user program) to access the secondary storage device in not block units but arbitrary units.

In recent years, the secondary storage device is being replaced with a flash ROM for the data storage area of the file system. In this case, an access with the same interface as the secondary storage device (floppy disk device or hard disk device) is enabled by preparing a special software driver (to be referred to as a flash disk driver) which enables a random read/write in units of blocks. This makes it possible to use a file system using the flash disk driver in the same form as the file system using the conventional floppy disk device or hard disk device as a data storage area.

However, if the file system using the flash ROM as a data storage area is realized by the file system using the conventional buffer cache, it is difficult to take full advantage of the flash ROM, and some problems arise. These problems will be described.

The flash ROM generally requires a special command sequence for a write, but can be directly accessed for a read similarly to a general memory. The flash ROM is lower in read access speed than the RAM but much higher than the disk device.

Despite of these characteristics, the conventional file system first reads out data to the buffer cache in units of blocks, and then copies the data to the memory area of a user even when a file system user (user program) performs only read processing. This poses the following problems:

(1) In a read, data can be directly copied from the flash ROM to the memory area of the user, but is wastefully copied to the buffer cache. Hence, the read processing time becomes undesirably long.

(2) The buffer cache is unpreferably assigned to a block associated with only read processing. That is, assignment of a buffer cache unnecessary for a read is done to decrease the memory utilization efficiency. This reduces another memory area such as a cache block area (i.e., a memory area used by a cache block assigned in a buffer cache) necessary for write processing.

SUMMARY OF THE INVENTION

The present invention has been made to solve the above drawbacks, and has as its object to make it possible to directly transfer data from a storage medium to the memory area of a user program in a data read in a file system which accesses a storage medium capable of being directly accessed by designating memory address in units of blocks.

To achieve the above object, an access control method according to one aspect of the present invention comprises the following steps.

That is, an access control method for accessing a storage medium capable of being directly accessed by designating memory address and a buffer for temporarily holding contents of the storage medium, comprises the generation step of generating block access information for accessing the storage medium in units of blocks on the basis of an access request designated by a user program, the calculation step of calculating an access address to the storage medium on the basis of an access destination block designated by the block access information, the copying step of, when the access request is a data read request, accessing, on the basis of the data read request, the storage medium using the block access information generated in the generation step and the access address calculated in the calculation step, and copying obtained data to a memory area managed by the user program, and the write step of, when the access request is a data write request, writing data on the basis of the data write request via the buffer using the block access information generated in the generation step and the access address calculated in the calculation step.

To achieve the above object, an access control apparatus according to another aspect of the present invention comprises the following arrangement.

That is, an access control apparatus for accessing a storage medium capable of being directly accessed by designating memory address and a buffer for temporarily holding contents of the storage medium, comprises generation means for generating block access information for accessing the storage medium in units of blocks on the basis of an access request designated by a user program, calculation means for calculating an access address to the storage medium on the basis of an access destination block designated by the block access information, copying means for, when the access request is a data read request, accessing, on the basis of the data read request, the storage medium using the block access information generated by the generation means and the access address calculated by the calculation means, and copying obtained data to a memory area managed by the user program, and write means for, when the access request is a data write request, writing data on the basis of the data write request via the buffer using the block access information generated by the generation means and the access address calculated by the calculation means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a table showing an example of a mapping table in this embodiment;

FIG. 5 is a table showing an example of a unit management table for managing the flash ROM in this embodiment;

FIG. 9 is a flow chart for explaining the write processing procedure in this embodiment.

DETAILED DESCRIPTION OF THE PREFERRED EMBODIMENT

A preferred embodiment of the present invention will now be described in detail in accordance with the accompanying drawings.

Figure 1:
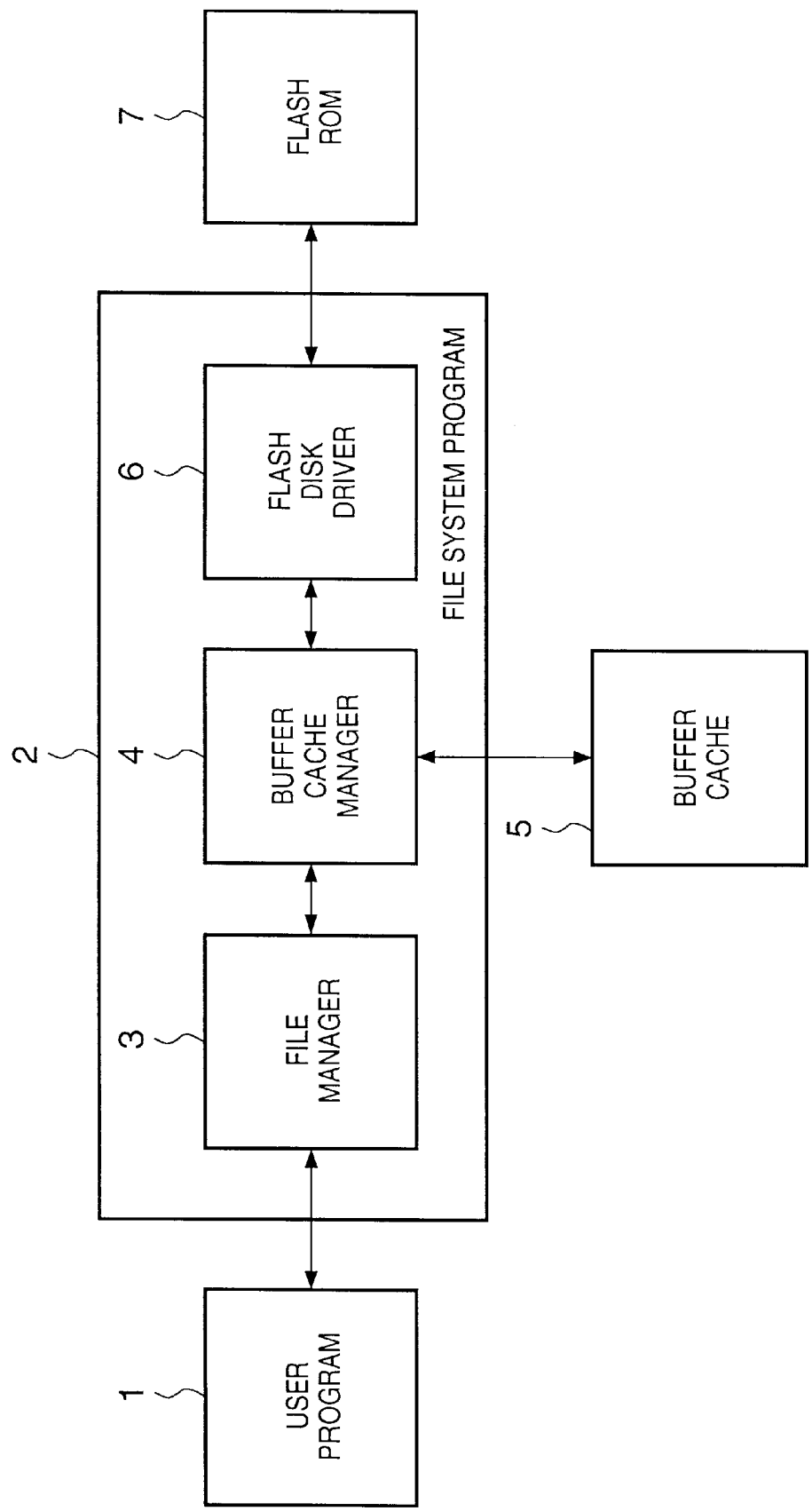
FIG. 1 is a block diagram showing the concept of a file system according to an embodiment.

FIG. 1 is a block diagram showing the concept of a file system according to the embodiment. In FIG. 1, reference numeral 1 denotes a user program using the file system; and 2, a file system program which realizes the file system.

Reference numeral 3 denotes a file manager which receives a request from the user program 1, and performs processing of opening/closing a file designated by a file name, processing of creating a new file and deleting an existing file, management of a file pointer indicating a read/write position on a file, management of a directory structure, and the like. Note that the file manager 3 may have a tree type directory or a single directory structure. The file manager 3 may manage a free area using a list or bitmap. In addition, the file manager 3 may manage a file with a file allocation table (FAT) like MS-DOS or with an i node like UNIX. A detailed file management method does not limit the present invention. The i node and FAT are written in disk blocks, and written in a flash ROM in this embodiment.

Reference numeral 4 denotes a buffer cache manager; and 5, a buffer cache managed by the buffer cache manager 4. The buffer cache manager 4 performs a read/write access to a flash ROM serving as a data storage area via the buffer cache 5 as needed. Reference numeral 6 denotes a flash disk driver which enables random read/write processing for a flash ROM serving as a data storage area in units of, e.g., 512-or 1,024-byte blocks, like a secondary storage device such as a floppy disk or hard disk; and 7, a flash ROM serving as the data storage area of the file system.

Figure 2:
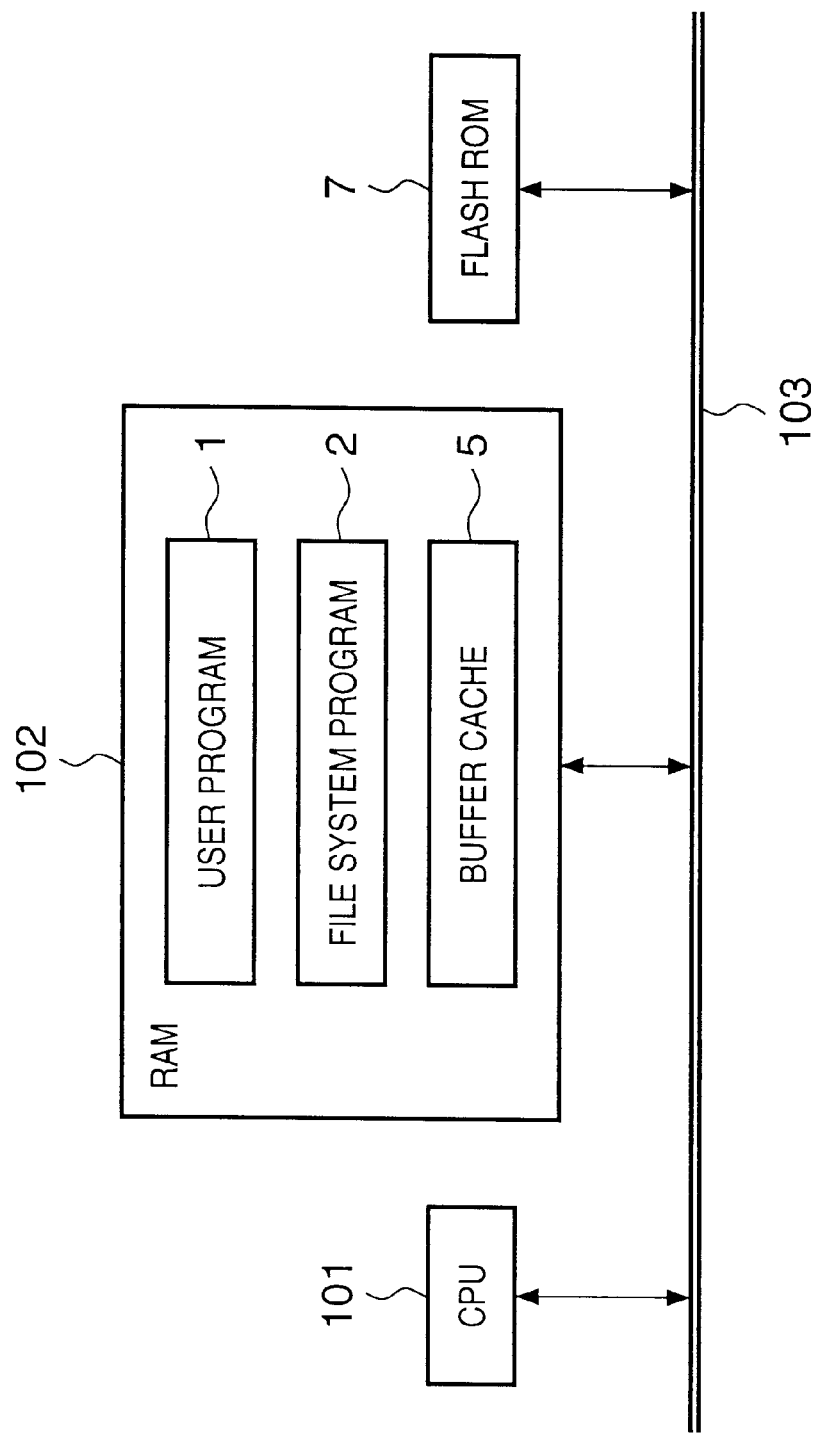
FIG. 2 is a block diagram showing a schematic hardware arrangement for realizing the above-described functional arrangement.

FIG. 2 is a block diagram showing a schematic hardware arrangement for realizing the above-described functional arrangement. In FIG. 2, reference numeral 101 denotes a CPU which executes the user program 1 and file system program 2; 102, a RAM which stores the program codes of the user program 1 and file system program 2, and provides an area as the buffer cache 5; 7, the flash ROM which serves as a data storage area, and is mapped in a normal memory space (memory space directly accessible by the CPU 101) similarly to the RAM 102; and 103, a system bus which connects the CPU 101, flash ROM 7, and RAM 102.

The flash ROM 7 generally has the following characteristics. In a read, the flash ROM 7 can be directly accessed similarly to a general RAM. In a write, the flash ROM 7 can only be accessed after data is erased. The CPU cannot directly write data in the flash ROM 7, unlike the RAM, and can write data by issuing a special command sequence to the flash ROM 7. Also when data is to be overwritten in a location where data has been written, the CPU must erase the written data. Data can only be erased in units of 64 bytes (to be called a unit). The erase count is guaranteed up to about 100,000.

The flash disk driver 6 which allows processing the flash ROM 7 with these characteristics like a disk device performs the following processing.

Figure 3:
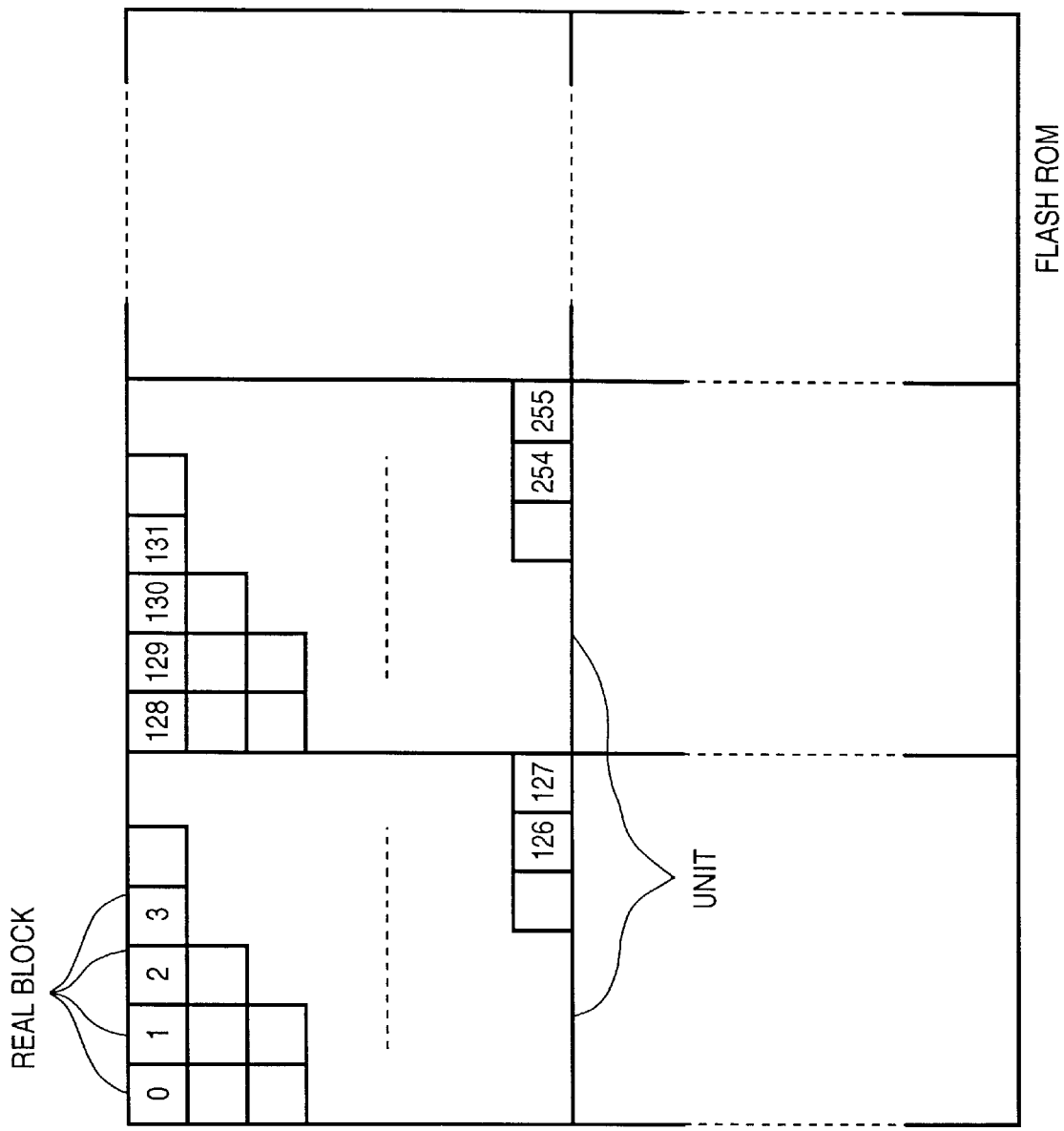
FIG. 3 is a view showing the management unit of a flash ROM according to this embodiment.

FIG. 3 is a view showing the management unit of the flash ROM according to this embodiment. In general, the disk device is processed in units of 512-or 1,024-byte blocks. Also, the flash ROM 7 is managed by dividing each unit into blocks (512-byte blocks in this example) and assigning real block numbers to them, as shown in FIG. 3.

To realize this management, a mapping table for mapping virtual block numbers and real block numbers is prepared. FIG. 4 is a table showing an example of the mapping table in this embodiment. Reference numeral 201 denotes a mapping table which stores pairs of virtual block numbers and real block numbers. The user (buffer cache manager 4 in this case) of the flash disk driver 6 designates a virtual block number to process a virtual disk device.

The flash disk driver 6 comprises a unit management table for managing real blocks and units. FIG. 5 is a table showing an example of the unit management table for managing the flash ROM in this embodiment. A unit management table 202 records the unit state (erase count) of each unit on the flash ROM 7, and the data write state of each real block included in the unit. As the data write state of the real block, the unit management table 202 records information representing a state (active state) in which data written in the real block is valid, a state (garbage state) in which data is invalid, or a state (free state) in which no data is written yet. In this embodiment, the mapping table 201 and unit management table 202 are stored in a predetermined block of the flash ROM 7 at the stop of the system, and loaded to the RAM at the start of the system. However, these tables may be managed by another method.

In the following description, the flash ROM has a unit size of 64 kbytes and a real block size of 512 bytes. In this case, one unit includes 128 real blocks. The units and blocks are numbered from 0.

In the initial state of the flash disk driver 6, data of all units are erased to set all real blocks to the free state, and all the contents of the mapping table 201 are also erased.

When the user issues a write request to, e.g., a block having a virtual block number of 3 (to be referred to as a virtual block [3]) in the initial state, a target unit is selected. In this case, a unit having the smallest erase count is selected. Assume that a unit having a unit number of 2 (to be referred to as a unit [2]) is selected. The unit [2] is used from the first one of real blocks all in the free state. Since a real block number at the head of the unit [2] is 256, a block having the real block number of 256 (to be referred to as a real block [256]) is selected. Data is written in the real block [256] to change the real block [256] to the active state. After that, the real block number of 256 is written in the entry of the virtual block [3] in the mapping table 201.

In subsequent write processing other than overwrite processing, real blocks in the unit [2] are sequentially selected. That is, data are written in real blocks [257], [258], ... in the above manner. If the unit [2] is used up, a new unit is similarly selected to repeat the same processing as described above.

When the user issues an overwrite request, e.g., a write request to the virtual block [3] again, the real block [256]

mapped by the mapping table 201 is invalidated to the garbage state (a corresponding entry in the unit management table 202 is updated). Similar to the write processing other than overwrite processing, a new real block is obtained, data is written to change the block to the active state, and the entry of the virtual block [3] in the mapping table 201 is updated to the new real block.

Repeating this overwrite processing increases the number of real blocks in the garbage state and decreases the number of real blocks in the free state. Hence, garbage collection must be executed at a given timing.

Garbage collection is done for a unit having no real block in the free state and many real blocks in the garbage state, and a unit having a small erase count. Units meeting these conditions can be obtained by referring to the unit management table 202. First, the contents of all real blocks in the active state in a unit subjected to garbage collection are copied to real blocks in the free state in another unit, the copied real blocks are changed to the active state, and corresponding entries in the mapping table 201 are updated. Upon completion of this, data in the target unit is erased, the erase count of this unit in the unit management table 202 is updated, and all real blocks belonging to this unit are changed to the free state (corresponding entries in the unit management table 202 are updated).

This garbage collection may be performed periodically or when the number of real blocks in the free state decreases to a certain threshold. A detailed garbage collection method does not limit the present invention.

When the user issues a read request, a real block mapped in a designated virtual block is obtained by referring to the mapping table 201, and the data contents are copied to the memory area of the user.

The processing is executed by the flash disk driver 6. In this embodiment, the flash disk driver 6 performs processing (address acquisition processing) of acquiring the memory address of a real block, in addition to the above write processing and read processing. This address acquisition processing allows the user (e.g., buffer cache manager 4) to acquire the start memory address of a real block and directly read out the contents of the real block. Accordingly, the user of the flash disk driver 6 can acquire the start memory address of a real block to directly read out the contents of the real block, instead of designating the memory area of the user and copying data in the real block to the designated area. In this embodiment, the user of the flash disk driver 6 is the buffer cache manager 4, and the memory area of the user is the buffer cache. However, it should be noted that the user and memory area change in accordance with the application form of the flash disk driver 6.

When the user issues a request (address acquisition request) of acquiring the memory address of a real block in read processing, the flash disk driver 6 obtains a real block number mapped in a designated virtual block by looking up the mapping table 201. The flash disk driver 6 calculates a memory address from the real block number. For example, the flash ROM 7 starts from a memory address of 0x80000000, and the real block number is 3. Since the block size is 512 bytes (0x200 bytes), the start address of the real block [3] is 0x80000000+0x200*3=0x80000600. The flash disk driver 6 sends back the calculation result as the memory address of the real block to the user.

A read and write in this embodiment will be explained in more detail.

Figure 6:
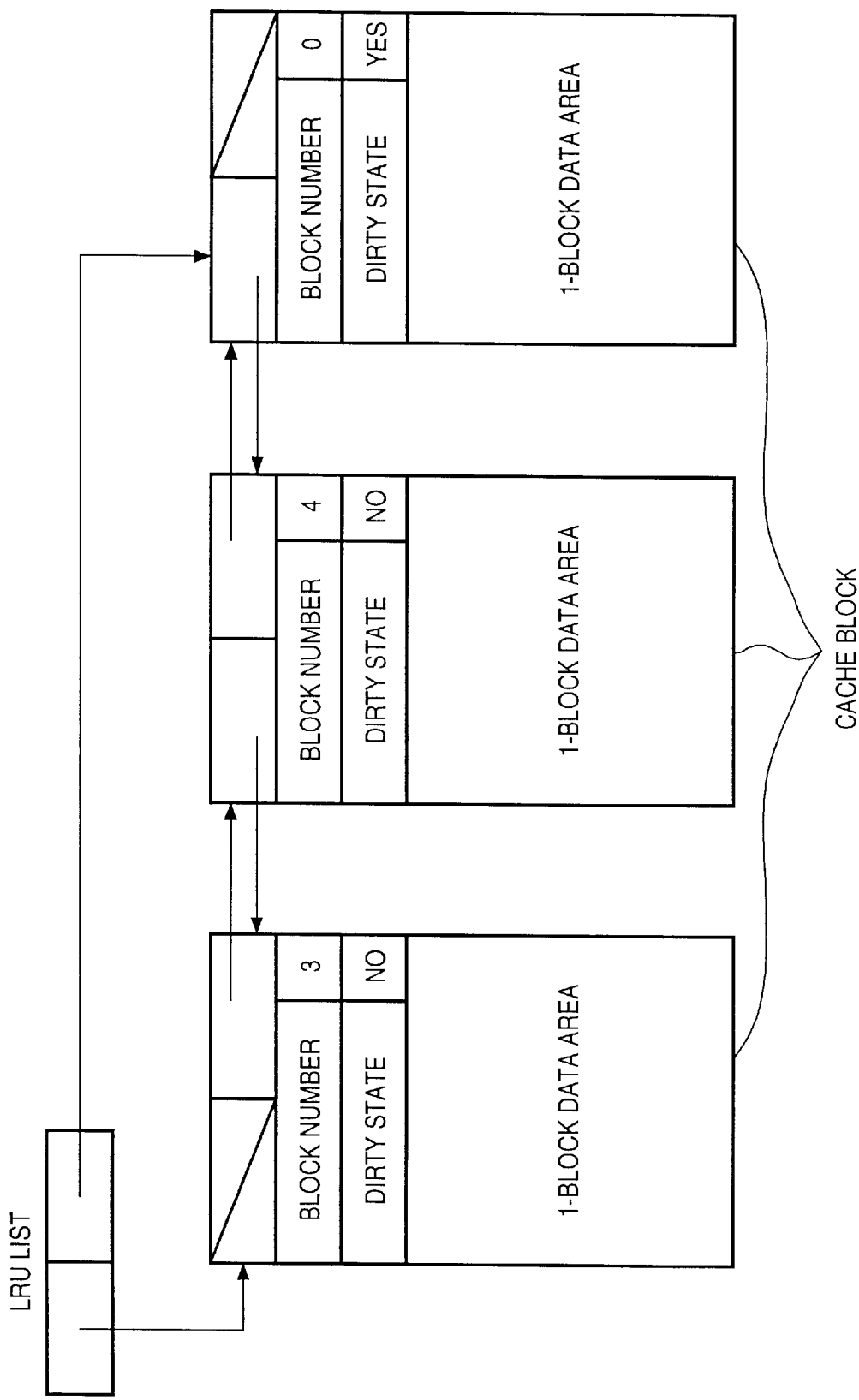
FIG. 6 is a view showing management of a buffer cache by a buffer cache manager.

When the user program 1 issues a file open, close, read, write, create, or erase request, the file manager 3 receives it to perform corresponding processing. At this time, a necessary read/write access to the data storage area (flash ROM 7 in this case) is generally performed via the buffer cache manager 4. FIG. 6 is a view showing management of the buffer cache by the buffer cache manager. The buffer cache manager 4 manages the buffer cache in units of blocks, as shown in FIG. 6. The blocks of the buffer cache will be called cache blocks.

Each cache block has a 1-block data area, an entry storing the block number, and an entry representing whether the block is in a dirty state (the cache is modified, and its content is different from the entity). The cache blocks are linked and managed by an LRU (Least Recently Used) list. The buffer cache area may be ensured permanently in system initialization, or by using a general-purpose memory allocation means provided by an OS or the like.

Figure 7:
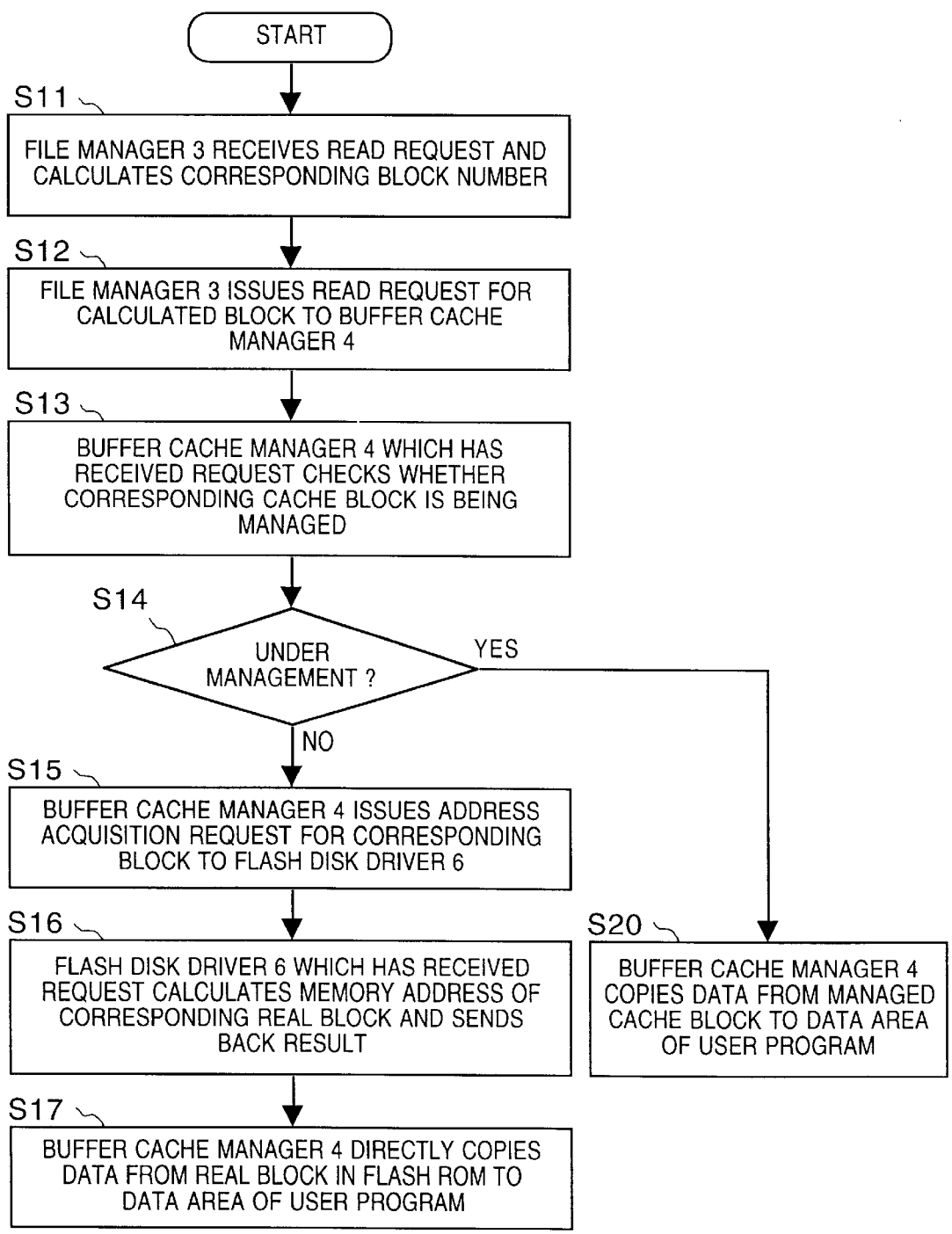
FIG. 7 is a flow chart for explaining file read processing in this embodiment.

In the above processing, processing in which a file A exists, and the user program 1 has opened the file A and starts reading it will be exemplified. FIG. 7 is a flow chart for explaining file read processing in this embodiment. Note that the file A is made up of two blocks (corresponding to virtual blocks) [256] and [257], and these blocks [256] and [257] are mapped to real blocks [4] and [5] by the flash disk driver 6. The presence of the file A in [256] and [257] is managed by the file manager 3 with the i node in the i node method or the FAT in the FAT method.

In step S11, if the file manager 3 receives a read request, it calculates a block number corresponding to the request. When the read request is "to read out 128 bytes from the head of the file A to a data area starting from 0x40000000 in the user program 1", the corresponding block is the block [256]. In step S12, the file manager 3 issues a read request to the buffer cache manager 4. The argument at this time includes four data, i.e., a block number of 256, an offset value of 0 byte from the head of the block, a data area address of 0x40000000, and a readout size of 128 bytes.

In step S13, the buffer cache manager 4 which has received the read request checks cache blocks under management to determine whether a cache block corresponding to the block [256] has already been managed. If the corresponding cache block exists (this cache block will be called a cache block [256]), the flow shifts from step S14 to step S20; if NO, to step S15.

If no cache buffer corresponding to the read-requested block exists, the address of a real block corresponding to the requested block is obtained, and the flash ROM is accessed by this address. First, in step S15, the buffer cache manager 4 issues an address acquisition request for the block [256] to the flash disk driver 6. In step S16, the flash disk driver 6 which has received the address acquisition request obtains a real block number ([4] in this case) corresponding to the virtual block [256] by looking up the mapping table 201, and calculates a memory address based on this real block number. In this case, the flash disk driver 6 calculates 0x80000000+0x200×4=0x80000800, and sends back this address value to the buffer cache manager 4.

In step S17, the buffer cache manager 4 which has received the memory address performs memory copying processing in accordance with the argument (offset value, data area address, and readout size) received in step S13. In this case, since the offset value, the data area address, the readout size, and the memory address of the real block [4] are 0 byte, 0x40000000, 128 bytes, and 0x80000800, respectively, the buffer cache manager 4 performs 128-byte memory copying processing from a source address of 0x80000800 to a destination address of 0x40000000. Note that the offset value is 0. Instead, when the offset value is, e.g., 64 bytes (0x40), the source address is 0x80000800+ 0x40=0x80000840. Data is directly copied from the flash ROM 7 to the data area of the user program 1.

To the contrary, if the cache block [256] has already existed in step S14, the flow advances to step S20. In step S20, the buffer cache manager 4 performs memory copying processing in accordance with the argument (offset value, data area address, and readout size) received in step S13. In this case, the source address is not the memory address of the real block but the address of the data area in the cache block, unlike in step S17. For example, when the start address of the data area in the cache block [256] is 0x20000000, and the offset value is 0 byte, the source address is 0x20000000; when the offset value is 64 bytes, the source address is 0x20000000+0x40=0x20000040. In this manner, the buffer cache has already existed, data is copied from the buffer cache to the data area of the user program 1.

Figure 8:
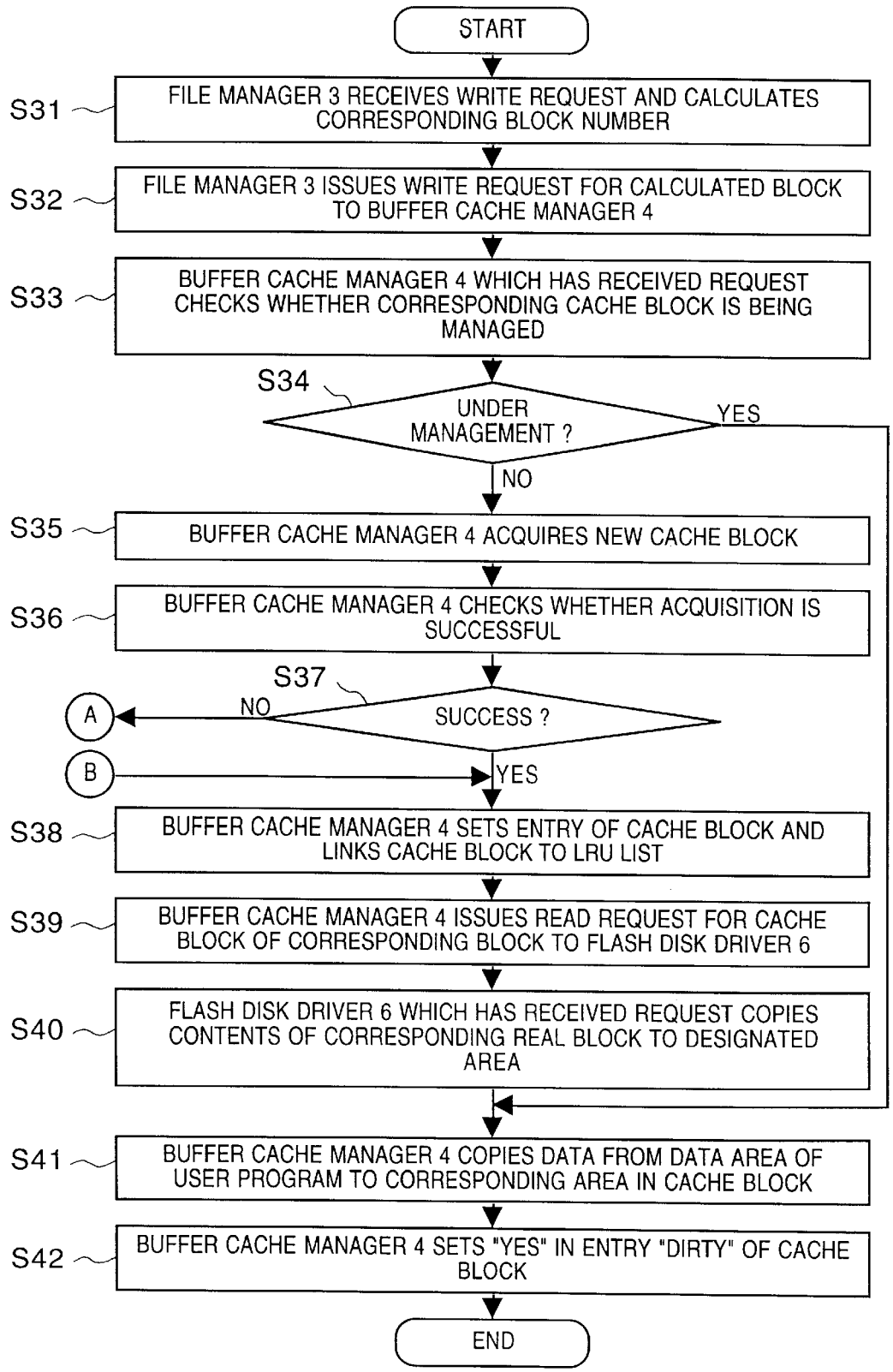
FIG. 8 is a flow chart for explaining a write processing procedure in this embodiment.

Write processing of this embodiment will be described by exemplifying that the file A has already existed, and the user program 1 has opened the file A and starts write processing. FIGS. 8 and 9 are flow charts for explaining write processing in this embodiment. The file A is made up of two blocks (corresponding to virtual blocks) [256] and [257], and these blocks [256] and [257] are mapped to the real blocks [4] and [5] by the flash disk driver 6.

In step S31, if the file manager 3 receives a write request, it calculates a block number corresponding to the request. When the write request is "to write the contents of a data area starting from 0x40000000 in the user program 1 in the file A from its head by 128 bytes", the write-requested block is the block [256]. In step S32, the file manager 3 issues a write request to the buffer cache manager 4. The argument at this time includes four data, i.e., a block number of 256, an offset value of 0 byte from the head of the block, a data area address of 0x40000000, and a write size of 128 bytes.

In step S33, the buffer cache manager 4 which has received the write request checks cache blocks under management to determine whether a cache block corresponding to the block [256] has already been managed. If the corresponding cache block [256] exists, the flow shifts from step S34 to step S41; if NO, to step S35.

If no corresponding cache block exists, data of a corresponding real block is cached to a cache block to write the data in step S35 and subsequent steps. First, in step S35, the buffer cache manager 4 acquires a new cache block in the buffer cache 5. In step S36, the buffer cache manager 4 checks whether acquisition of the new cache block is successful (whether a free cache block exists). If NO in step S37, the flow shifts from S37 to S50 in FIG. 9; if YES in step S37, from S37 to S38.

In step S38, the buffer cache manager 4 sets "256" in the entry "block number" of the acquired cache block, and links the cache block to the LRU list. The cache block whose block number is set to "256" is called a cache block [256]. In step S39, the buffer cache manager 4 issues a read request for the block [256] to the flash disk driver 6. At this time, the buffer cache manager 4 designates to write data read out to the data area of the cache block [256].

In step S40, the flash disk driver 6 which has received the request copies 1-block data from a real block corresponding to the virtual block [256] to a designated data area by the above-mentioned read processing. Upon completion of this read processing, the flow advances to step S41.

In step S41, the buffer cache manager 4 performs memory copying processing in accordance with the argument (offset value, data area address, and write size) received in step S33. For example, when the head address of the data area in the cache block [256] is 0x20000000, the buffer cache manager 4 performs 128-byte memory copying processing using a source address of 0x40000000, a destination address of 0x20000000, since the offset value, the data area address, and the write size are 0 byte, 0x40000000 and 128 bytes, respectively. Note that when the offset value is, e.g., 64 bytes, the destination address is 0x20000000+0x40= 0x20000040. In this way, data is directly copied from the data area of the user program 1 to the data area of the cache block [256]. In step S42, the buffer cache manager 4 sets a value corresponding to "Yes" in the entry "dirty" of the cache block [256].

If the buffer cache manager 4 cannot acquire any new cache block and advances to step S50 in FIG. 9, it extracts the oldest cache block accessed among cache blocks under management from the head of the LRU list, and checks the dirty state. Note that a cache block linked to the head of the LRU list is the oldest one. If this cache block is in the dirty state in step S51, the flow shifts from step S51 to step S52; if NO, to step S54.

If YES in S51, data of the cache block must be written in the flash ROM 7 before the data is flushed. For this purpose, in step S52, the buffer cache manager 4 issues a write request to the flash disk driver 6. The flash disk driver 6 which has received the request performs the above overwrite processing for a designated virtual block in step S53. Upon completion of the write processing, the buffer cache manager 4 acquires the cache block extracted from the head of the LRU list as a new cache block in step S54, and returns to step S38 in FIG. 8.

In the above example, write processing to the lash ROM 7 is done only when no new cache block is acquired. Alternatively, so-called sync processing may be done in which the contents of a cache block in the dirty state are written in the flash ROM and recovered from the dirty state. The sync processing may be executed at the file close timing or periodically every 10 sec. The sync processing method does not limit the present invention.

As described above, in the file system of this embodiment, the file manager 3 receives a file open, close, read, write, create, or erase request from the user program 1, and performs corresponding processing. When a read access to the data storage area (flash ROM 7) occurs, the buffer cache manager 4 and flash disk driver 6 execute the following control. More specifically, if no corresponding data exists in the buffer cache 5, data is directly copied from the flash ROM 7 to the memory area of the user program. If data corresponding to the buffer cache 5 exists, the data is transferred from the buffer cache to the memory area of the user program. The flash disk driver 6 which processes the flash ROM as a pseudo disk accessed in units of blocks acquires a corresponding memory address in the flash ROM in executing direct data transfer from the flash ROM to the user program. The buffer cache manager 4 executes memory copying processing based on the address, and realizes direct data transfer.

When a write access occurs, the buffer cache manager 4 and flash disk driver 6 perform write processing via the buffer cache 5, similarly to a general file system.

According to this embodiment which realizes the above operation, when the user program performs only read processing for a given block, no cache block area is assigned. Hence, this embodiment can provide a simple file system with a high execution efficiency.

As is apparent from the above description, this embodiment can execute the above-mentioned processing without requiring any special hardware.

In this embodiment, if a corresponding cache block is not managed when a read request is issued, data of the corresponding block is directly copied from the flash ROM to the data area of the user program, as described in steps S14 to S17 in FIG. 7. No cache block area for this data is ensured in terms of a high memory utilization efficiency.

Alternatively, when a read request is issued, a cache block area for this data may be ensured though the data is not copied. In this case, processing in steps S35 to S38 in FIG. 8 and steps S50 to S54 in FIG. 9 may be executed between steps S14 and S15 in FIG. 7. According to this case, in a read, a data is not copied in the buffer cache, and the read speed increases.

The present invention may be applied to a system constituted by a plurality of devices (e.g., a host computer, interface device, reader, and printer) or an apparatus comprising a single device (e.g., a copying machine or facsimile apparatus).

The object of the present invention is realized even by supplying a storage medium storing software program codes for realizing the functions of the above-described embodiment to a system or apparatus, and causing the computer (or a CPU or MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, hard disk, optical disk, magnetooptical disk, CD-ROM, CD-R, magnetic tape, nonvolatile memory card, ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiment are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the present invention, data can be directly transferred from the storage medium to the memory area of the user program in a data read in an apparatus which accesses a storage medium capable of being directly accessed by designating memory address, and the file system of the apparatus. In a read, this data is not copied in the buffer cache, and the read speed increases.

In a read, when even a cache block area for temporarily storing data in units of blocks is not ensured in the buffer cache, the memory utilization efficiency increases.

As many apparently widely different embodiments of the present invention can be made without departing from the spirit and scope thereof, it is to be understood that the invention is not limited to the specific embodiments thereof except as defined in the appended claims.

What is claimed is:

1. An access control method for accessing a flash memory which has a read speed higher than a write speed and which is accessible directly by designating a memory address, comprising:
   a generation step of generating block access information for accessing the flash memory in units of blocks on the basis of an access request designated by a user program;
   a calculation step of calculating an access address to the flash memory on the basis of an access destination block designated by the block access information;
   a reading step of, when the access request is a data read request, directly reading data from the flash memory without using a buffer for temporarily holding contents of the flash memory, by accessing the flash memory with the block access information generated in the generation step and the access address calculated in the calculation step, and copying the read data directly to a memory area managed by the user program; and
   a write step of, when the access request is a data write request, writing data to the flash memory via the buffer based on the block access information generated in the generation step and the access address calculated in the calculation step.

2. The method according to claim 1, wherein the method further comprises a determination step of, when the access request is a data read request, determining whether a block subjected to the data read request is copied in the buffer, and
   the reading step comprises, when the block subjected to the data read request is determined to be copied in the buffer, copying the requested data from the buffer to the memory area managed by the user program.

3. The method according to claim 1, further comprising an ensuring step of, when the access request is a data read request, and data obtained from the flash memory is copied to the memory area managed by the user program in the reading step, ensuring in the buffer an area where the data can be copied.

4. The method according to claim 1, further comprising:
   a determination step of, when the access request is a data write request, determining whether a block subjected to the data write request is copied in the buffer;
   a first write step of, when the block is determined to be copied in the determination step, writing data via the data copied in the buffer;
   a copying step of, when no block is determined to be copied in the determination step, accessing the flash memory using the access address, calculated in the calculation step, on the basis of the data write request, and copying obtained data in the buffer; and
   a second write step of writing data via the data copied in the buffer in the copying step.

5. The method according to claim 4, further comprising a ensuring step of, when the access request is a data write request, and no block is determined to be copied in the determination step, ensuring in the buffer an area where data obtained from the flash memory can be copied before the data obtained from the storage medium is copied in the buffer in the copying step.

6. The method according to claim 1, wherein the block is obtained by dividing an erase unit of the flash memory by a predetermined number.

7. The method according to claim 6, wherein the method further comprises providing a mapping table for making a block designated by the block access information generated in the generation step correspond to a real block in the flash memory, and the calculation step comprises obtaining an actual access destination block from the access destination block designated by the block access information and the mapping table, and converting the actual access destination block into an access address to the flash memory.

8. The method according to claim 1, wherein when the access request is a data write request, data is written to the flash memory only after data already in the flash memory is erased.

9. An access control apparatus for accessing a flash memory which has a read speed higher than a write speed and which is accessible directly by designating a memory address, comprising:

generation means for generating block access information for accessing the flash memory in units of blocks on the basis of an access request designated by a user program;

calculation means for calculating an access address to the flash memory on the basis of an access destination block designated by the block access information;

reading means for, when the access request is a data read request, directly reading data from the flash memory without using a buffer for temporarily holding contents of the flash memory, by accessing the flash memory with the block access information generated by said generation means and the access address calculated by said calculation means, and copying the read data directly to a memory area managed by the user program; and write means for, when the access request is a data write request, writing data to the flash memory via the buffer based on the block access information generated by said generation means and the access address calculated by said calculation means.

10. The apparatus according to claim 9, wherein said apparatus further comprises determination means for, when the access request is a data read request, determining whether a block subjected to the data read request is copied in the buffer, and when the block subjected to the data read request is determined to be copied in the buffer, said reading means copies the requested data from the buffer to the memory area managed by the user program.

11. The apparatus according to claim 9, further comprising ensuring means for, when the access request is a data read request, and said reading means copies data obtained from the flash memory to the memory area managed by the user program, ensuring in the buffer an area where the data can be copied.

12. The apparatus according to claim 9, further comprising:

determination means for, when the access request is a data write request, determining whether a block subjected to the data write request is copied in the buffer;

first write means for, when said determination means determines that the block is copied, writing data via the data copied in the buffer;

copying means for, when said determination means determines that no block is copied, accessing the flash memory using the access address, calculated by said calculation means, on the basis of the data write request, and copying obtained data in the buffer; and second write means for writing data via the data copied in the buffer by said copying means.

13. The apparatus according to claim 12, further comprising ensuring means for, when the access request is a data write request, and said determination means determines that no block is copied, ensuring in the buffer an area where data obtained from the flash memory can be copied before said copying means copies the data obtained from the flash memory in the buffer.

14. The apparatus according to claim 9, wherein the block is obtained by dividing an erase unit of the flash memory by a predetermined number.

15. The apparatus according to claim 14, wherein said apparatus further comprises a mapping table for making a block designated by the block access information generated by said generation means correspond to a real block in the flash memory, and said calculation means obtains an actual access destination block from the access destination block designated by the block access information and the mapping table, and converts the actual access destination block into an access address to the flash memory.

16. The apparatus according to claim 9, wherein when the access request is a data write request, data is written to the flash memory only after data already in the flash memory is erased.

17. A computer-readable memory storing a control program for realizing, by a computer, access control for accessing a flash memory which has a read speed higher than a write sped and which is accessible directly by designating a memory address and a buffer for temporarily holding contents of the flash memory, the control program comprising:

code of the generation step of generating block access information for accessing the flash memory in units of blocks on the basis of an access request designated by a user program;

code of a calculation step of calculating an access address to the flash memory on the basis of an access destination block designated by the block access information;

code of a reading step of, when the access request is a data read request, directly reading data from the flash memory without using a buffer for temporarily holding contents of the flash memory, by accessing the flash memory with the block access information generated in the generation step and the access address calculated in the calculation step, and copying the read data directly to a memory area managed by the user program; and code of a write step of, when the access request is a data write request, writing data to the flash memory via the buffer based on the block access information generated in the generation step and the access address calculated in the calculation step.

18. The computer-readable memory according to claim 17, wherein the control program further comprises code of a determination step of, when the access request is a data read request, determining whether a block subjected to the data read request is copied in the buffer, and the reading step comprises, when the block subjected to the data read request is determined to be copied in the buffer, copying the requested data from the buffer to the memory area managed by the user program.

19. The computer-readable memory according to claim 17, wherein the control program further comprises code of an ensuring step of, when the access request is a data read request, and data obtained from the flash memory is copied to the memory area managed by the user program in the reading step, ensuring in the buffer an area where the data can be copied.

20. The computer-readable memory according to claim 17, wherein the control program further comprises:

code of a determination step of, when the access request is a data write request, determining whether a block subjected to the data write request is copied in the buffer;

code of a first write step of, when the block is determined to be copied in the determination step, writing data via the data copied in the buffer;

code of a copying step of, when no block is determined to be copied in the determination step, accessing the flash memory using the access address, calculated in the calculation step, on the basis of the data write request, and copying obtained data in the buffer; and code of a second write step of writing data via the data copied in the buffer in the copying step.

21. The computer-readable memory according to claim 20, wherein the control program further comprises code of an ensuring step of, when the access request is a data write request, and no block is determined to be copied in the determination step, ensuring in the buffer an area where data obtained from the flash memory can be copied before the data obtained from the storage medium is copied in the buffer in the copying step.

22. The computer-readable memory according to claim 17, wherein the block is obtained by dividing an erase unit of the flash memory by a predetermined number.

23. The computer-readable memory according to claim 22, wherein the control program further comprises a mapping table for making a block designated by the block access information generated in the generation step correspond to a real block in the flash memory, and the calculation step comprises obtaining an actual access destination block from the access destination block designated by the block access information and the mapping table, and converting the actual access destination block into an access address to the flash memory.

24. The computer-readable memory according to claim 15, wherein when the access request is a data write request, data is written to the flash memory only after data already in the flash memory is erased.

* * * * *

UNITED STATES PATENT AND TRADEMARK OFFICE
CERTIFICATE OF CORRECTION

PATENT NO.   : 6,526,472 B2
DATED        : February 25, 2003
INVENTOR(S)  : Suzuki It is certified that error appears in the above-identified patent and that said Letters Patent is hereby corrected as shown below:

<u>Title page, Item [54] and Column 1, lines 2 and 3,</u>
 "COMPUTER READABLE" should read -- COMPUTER-READABLE --.

<u>Drawings,</u>
Sheet 4, Figure 4, "VERTUAL" should read -- VIRTUAL --.

<u>Column 1,</u>
Line 19, "512-or" should read -- 512- or --; and
Line 48, "of" should be deleted.

<u>Column 3,</u>
Line 47, "512-or" should read -- 512- or --.

<u>Column 4,</u>
Line 11, "512-or" should read -- 512- or --.

Signed and Sealed this

Fourth Day of November, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,526,472 B2
DATED : February 25, 2003
INVENTOR(S) : Suzuki

It is certified that error appears in the above-identified patent and that said Letters Patent is hereby corrected as shown below:

Column 10,
Line 53, "a" should read -- an --.

Column 14,
Line 16, "15," should read -- 17, --.

Signed and Sealed this

Seventh Day of September, 2004

JON W. DUDAS
*Director of the United States Patent and Trademark Office*